United States Patent
Weber et al.

(10) Patent No.: US 7,051,992 B2
(45) Date of Patent: May 30, 2006

(54) TUBELESS ACTUATOR WITH REDUCED SECONDARY AIR GAP

(75) Inventors: Alexis C. Weber, Chihuahua (MX); Alejandro Moreno, El Paso, TX (US)

(73) Assignee: Delphi Technologies, Inc., Troy, MI (US)

( * ) Notice: Subject to any disclaimer, the term of this patent is extended or adjusted under 35 U.S.C. 154(b) by 68 days.

(21) Appl. No.: 10/647,568

(22) Filed: Aug. 25, 2003

(65) Prior Publication Data

US 2005/0045842 A1 Mar. 3, 2005

(51) Int. Cl.
*F16K 31/02* (2006.01)

(52) U.S. Cl. .......................... 251/129.15; 251/129.05; 251/129.21

(58) Field of Classification Search ........... 251/129.05, 251/129.15, 129.16, 129.18, 129.2, 129.21, 251/129.22; 137/625.65; 123/519, 520, 123/568.18
See application file for complete search history.

(56) References Cited

U.S. PATENT DOCUMENTS

| | | | | |
|---|---|---|---|---|
| 4,719,943 A | * | 1/1988 | Perach | 251/129.05 |
| 5,584,323 A | * | 12/1996 | Yamamuro | 251/129.21 |
| 6,050,245 A | * | 4/2000 | Cook et al. | 123/520 |
| 6,223,733 B1 | * | 5/2001 | Busato et al. | 123/568.18 |
| 6,247,456 B1 | * | 6/2001 | Everingham et al. | 123/520 |
| 6,330,878 B1 | * | 12/2001 | Perry et al. | 123/519 |
| 6,360,972 B1 | | 3/2002 | Fuseya et al. | |
| 6,373,363 B1 | | 4/2002 | Spakowski et al. | |
| 6,467,495 B1 | * | 10/2002 | Shost | 251/129.15 |
| 6,615,780 B1 | | 9/2003 | Lin et al. | |
| 6,739,573 B1 | * | 5/2004 | Balsdon | 251/129.05 |

\* cited by examiner

*Primary Examiner*—Tuan Nguyen
(74) *Attorney, Agent, or Firm*—Jimmy L. Funke

(57) ABSTRACT

A tubeless actuator includes a frame in which a primary plate and a secondary plate are disposed. A bobbin is disposed within the frame between the primary plate and the secondary plate. The bobbin is keyed to the secondary plate in order to maintain the alignment between the bobbin and the secondary plate. Moreover, the plunger slides in direct contact with the bobbin.

6 Claims, 3 Drawing Sheets

TUBELESS ACTUATOR WITH REDUCED SECONDARY AIR GAP

TECHNICAL FIELD

The present invention relates generally to devices used to control the flow of petroleum fuel vapors between a carbon canister and a combustion engine.

BACKGROUND OF THE INVENTION

In order to comply with state and federal environmental regulations, most motor vehicles are now equipped with a carbon canister installed to trap and store petroleum fuel vapors from the fuel tank. With the canister, fuel vapors are not vented to the atmosphere, but are instead trapped in the canister and then periodically purged from the canister into the engine where they are burned along with the air-fuel mixture.

Typically, a tractive electromagnetic actuator can be used to purge the fuel vapors from the canister. In general, these types of actuators can include a coil, a plunger, a primary plate, a secondary plate, and a frame. The coil can be energized in order to create a magnetic field. The plunger, the primary plate, the secondary plate, and the frame can be used to create a low reluctance path for the magnetic field and to concentrate the magnetic field in certain zones of the magnetic circuit established by the actuator.

It happens that two relatively large reluctances exist in such actuators. For example, a first relatively large reluctance exists between the primary plate and the plunger and a second relatively large reluctance exists between the secondary plate and the plunger. In most cases, the first reluctance varies with the plunger travel. On the other hand, the second reluctance is nearly constant throughout the plunger travel. Since most of the magnetic energy is stored in these two reluctances, or air gaps, it is beneficial to reduce the secondary air gap as much as possible in order to increase the output force of the actuator.

It is a common practice to utilize a thin, non-ferromagnetic spacer, e.g., a very thin walled tube, around the plunger to serve the dual function of spacer and bearing surface for the plunger, while minimizing the secondary air gap. The inclusion of the spacer increases the cost of the actuator by increasing the number of parts within the actuator and increasing the assembly time of the actuator.

The present invention has recognized these prior art drawbacks, and has provided the below-disclosed solutions to one or more of the prior art deficiencies.

SUMMARY OF THE INVENTION

A tubeless actuator includes a frame in which a primary plate and a secondary plate are disposed. A bobbin is disposed within the frame between the primary plate and the secondary plate. Preferably, the bobbin is keyed to the secondary plate in order to maintain alignment between the bobbin and the secondary plate.

In one aspect, the bobbin can be keyed to the secondary plate by an annular rib which extends from the bobbin. The annular rib engages an annular groove established by the secondary plate to maintain the alignment between the secondary plate and the bobbin.

In another aspect, the bobbin can be keyed to the secondary plate by a central hub that extends from the secondary plate. The central hub engages a central bore that is established by the bobbin. This engagement of parts maintains the alignment between the secondary plate and the bobbin.

Moreover, in still another aspect of the present invention, the bobbin can be keyed to the secondary plate by plural wedge-shaped protrusions that extend from the bobbin. Plural wedge-shaped openings are established by the secondary plate. The wedge-shaped protrusions engage the wedge-shaped openings in order to maintain the alignment between the secondary plate and the bobbin.

In a preferred embodiment, a plunger is slidably disposed within the bobbin. Preferably; the plunger slides in direct contact with the bobbin. Moreover, a secondary air gap is established between an inner wall established by the secondary plate and an outer wall established by the plunger. Preferably, the secondary air gap is not larger than one-quarter of a millimeter (0.25 mm).

Further, in a preferred embodiment, the plunger defines a distal end and an annular notch is established around the outer periphery of the distal end of the plunger. A frusto-conical spring is disposed around the distal end of the plunger and engages the annular notch.

In another aspect of the present invention, a carbon canister purge valve for a motor vehicle includes a valve body. An inlet passage and an outlet passage are established by the valve body and are in fluid communication with each other. A tubeless actuator is disposed within the valve body and can be energizable to block the flow of fluid between the inlet passage and the outlet passage.

In yet another aspect of the present invention, a tubeless actuator includes a frame. A primary plate and a secondary plate are disposed within the frame. A bobbin is disposed within the frame between the primary plate and the secondary plate. Moreover, a plunger is slidably disposed within the bobbin. The plunger slides in direct contact with the bobbin.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
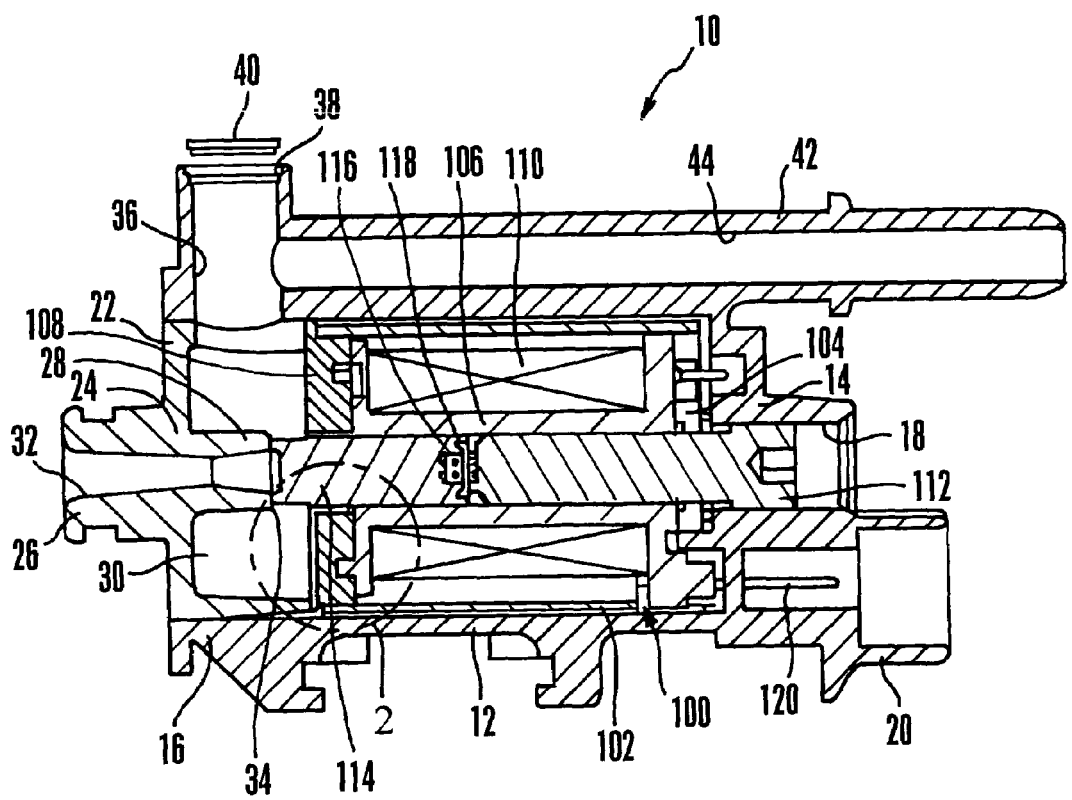
FIG. 1 is a cross-section view of a tubeless actuator installed in a valve body.

Referring initially to FIG. 1, a valve body is shown and is generally designated 10. FIG. 1 shows that the valve body includes a hollow, generally cylindrical housing 12 having a closed inlet end 14 and an open outlet end 16. As shown in FIG. 1, the inlet end 14 of the housing 12 is formed with a plunger stop access bore 18 that can be used to access an adjustable plunger stop, described in detail below. Moreover, the inlet end 14 of the valve body housing 12 establishes a female connector socket 20. At least one terminal, described below, extends from within the valve body into the female connector socket 20. It can be appreciated that the female connector socket 20 is sized and shaped to receive a correspondingly sized and shaped male connector (not shown).

FIG. 1 further shows an outlet end cap 22 that is installed in the open outlet end 16 of the housing 12. Preferably, the outlet end cap 22 includes an outlet tube 24. As shown, the outlet tube 24 includes an external portion 26 that extends outwardly from the outlet end cap 22 and an internal portion 28 that extends inwardly, i.e., into the valve body 10, from the outlet end cap 22. A generally fluid chamber 30 is established around the internal portion 28 of the outlet tube 24. Further, the outlet tube 24 establishes an outlet passage 32 that leads to the fluid chamber 30. In a preferred embodiment, the outlet passage 32 is circumscribed by a plunger seat 34 at the end of the internal portion 28 of the outlet tube 24. It is to be understood that a plunger, described below, can engage the plunger seat 34 in order to block the flow of fluid from the fluid chamber 30 to the outlet passage 32.

As shown in FIG. 1, an access bore 36 extends from the fluid chamber 30 through the valve body housing 12. FIG. 1 shows that the access bore 36 terminates in an access port 38 that can be blocked by an access bore cover 40 in order to prevent access to the access bore 36 and thus, the fluid chamber 30.

In a preferred embodiment, an inlet tube 42 can extend from the access bore 36 along the length of the valve body housing 12. The inlet tube 42 establishes an inlet passage 44 that is in fluid communication with the access bore 36. Accordingly, a fluid flow path is established through the valve body 10 from the inlet tube 42 to the access bore 36, from the access bore 36 to the fluid chamber 30, and from the fluid chamber 30 to the outlet tube 24.

Still referring to FIG. 1, a tubeless actuator, designated 100, is installed within the valve body 10 between the inlet end 14 and the outlet end 16 of the valve body housing 12. As shown in FIG. 1, the tubeless actuator 100 includes a hollow, generally cylindrical frame 102. A primary plate 104 is disposed within the frame 102 adjacent to the inlet end 14 of the valve body housing 12. A hollow, generally "I" shaped bobbin 106 is installed within the frame 102 adjacent to the primary plate 104. A secondary plate 108 abuts the bobbin 106 such that the bobbin 106 is sandwiched between the primary plate 104 and the secondary plate 108.

As shown in FIG. 1, a coil 110 is wound around the bobbin 106. Preferably, a plunger stop 112 is installed within the bobbin 106. It can be appreciated that the plunger stop 112 can be formed with external threads that engage internal threads formed by the plunger stop access bore 18 established by the inlet end 14 of the valve body housing 12. Alternatively, the threads on the plunger stop 112 can simply cut into the plunger stop access bore 18 as the plunger stop 112 is rotated relative thereto, e.g., like a self-tapping screw. It is to be understood that the plunger stop 112 cannot move relative to the bobbin 106 unless it is being adjusted, e.g., by rotating plunger stop 112 relative to the plunger stop access bore 18.

FIG. 1 further shows a plunger 114 that is slidably disposed within the bobbin 106 between the plunger stop 112 and the outlet end cap 22. An internal spring pocket 116 is established within the end of the plunger 114 closest to the plunger stop 112. A spring 118 is installed in compression within the spring pocket 116 between the plunger stop 112 and the plunger 114. When the coil 110 is de-energized, the spring 118 forces the plunger 114 to the left looking at FIG. 1 and the plunger 114 engages the plunger seat 34 in order to block the flow of fluid from the fluid chamber 30 to the outlet passage 32. FIG. 1 also shows an terminal 120 that extends from the actuator 100 into the female connector socket 20. It is to be understood that the terminal 120 and another terminal (not shown) provide power to the coil 110.

Figure 2:
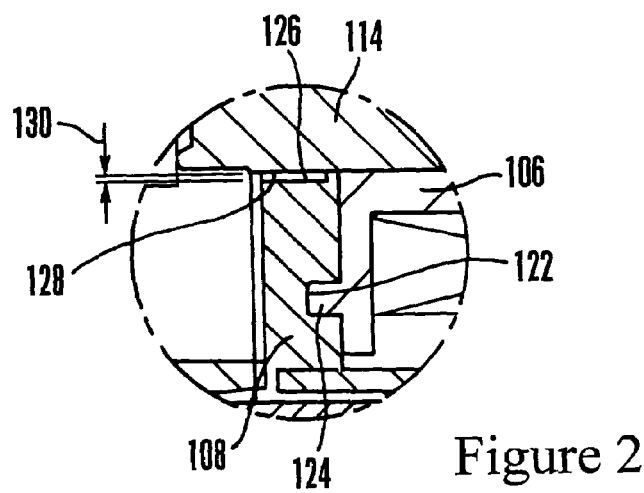
FIG. 2 is a detailed view of the tubeless actuator taken at circle 2 in FIG. 1.

Referring now to FIG. 2, details concerning the tubeless actuator 100 can be seen. FIG. 2 shows that a generally ring-shaped, annular rib 122 extends from the bobbin 106 toward the outlet end 16 of the valve body housing 12. The annular rib 122 is greater in diameter than an inner wall 126 of the secondary plate 108. A correspondingly sized and shaped annular groove 124 is established within the secondary plate 108 such that it faces the bobbin 106. Accordingly, the annular rib 122 formed by the bobbin 106 fits into the annular groove 124 formed by the secondary plate 108. As intended by the present invention, the annular rib 122 engages the annular groove 124 in order to maintain proper alignment between the secondary plate 108 and the bobbin 106.

FIG. 2 further shows that the secondary plate 108 defines an inner wall 126 and that the plunger 114 defines an outer wall 128. As shown, a generally annular, secondary air gap 130 is established between the inner wall 126 of the secondary plate 108 and the outer wall 128 of the plunger 114. In a preferred embodiment, the secondary air gap 130 is approximately one-quarter of a millimeter (0.25 mm). FIG. 2 clearly shows that a non-ferromagnetic spacer, e.g., a tube or sleeve, is not installed around the plunger 114 between the plunger 114 and the bobbin 106. Thus, the secondary air gap 130 can be completely minimized.

Figure 3:
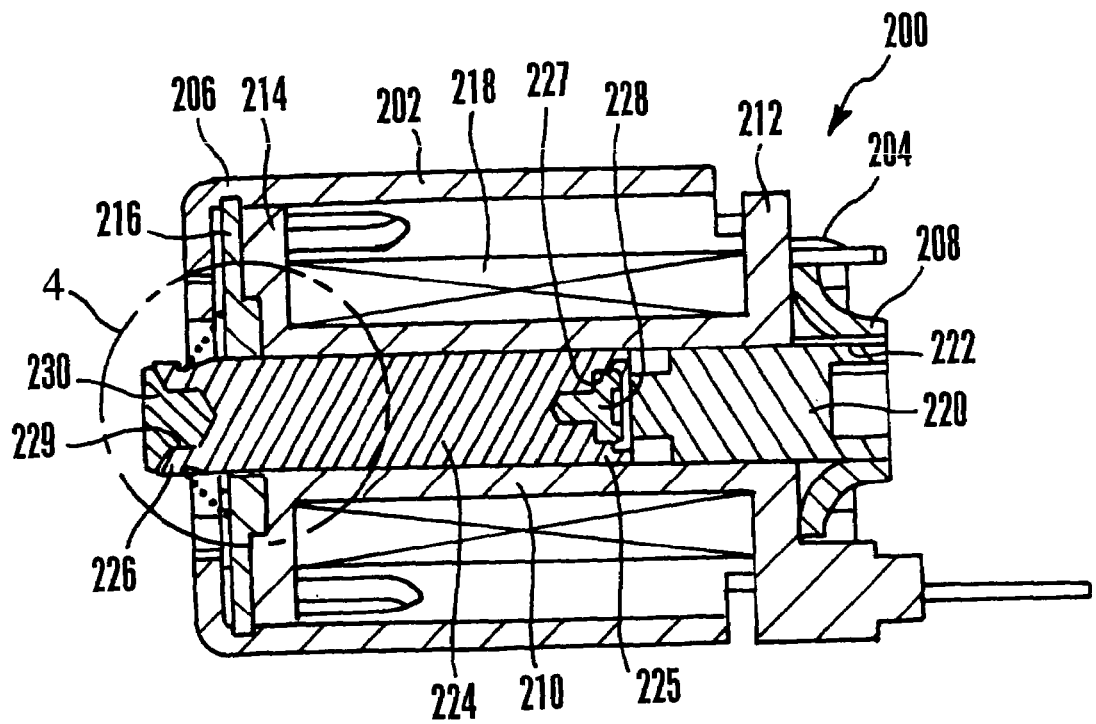
FIG. 3 is a cross-section view of a first alternative tubeless actuator.

Referring now to FIG. 3, a first alternative tubeless actuator is shown and is generally designated 200. It is to be understood that the tubeless actuator 200 shown in FIG. 3 can be installed in the valve body 10 described above in conjunction with FIG. 1.

FIG. 3 shows that the tubeless actuator 200 includes a hollow, generally cylindrical frame 202 that defines a proximal end 204 and a distal end 206. As shown, a primary plate 208 is installed within the frame 202 adjacent to the proximal end 204 of the frame 202. A hollow, generally "I" shaped bobbin 210 is installed within the frame 202 adjacent to the primary plate 208. The bobbin 210 includes a proximal flange 212 and a distal flange 214. FIG. 3 shows that the proximal flange 212 of the bobbin 210 is adjacent to the primary plate 208. Moreover, a secondary plate 216 is installed within the frame 202 such that it is adjacent to the distal flange 214 of the bobbin 210. As such, the bobbin 210 is sandwiched between the primary plate 208 and the secondary plate 214.

As shown in FIG. 3, a coil 218 is wound around the bobbin 210. Moreover, a plunger stop 220 is installed within the bobbin 210, e.g., such that it is surrounded by the proximal flange 212. It can be appreciated that the plunger stop 220 can be formed with external threads that engage internal threads formed by the primary plate 208. It is to be understood that the plunger stop 220 cannot move relative to the bobbin 210 unless it is being adjusted, e.g., by rotating plunger stop 220 relative to the primary plate 208.

FIG. 3 further shows a plunger 224 that is slidably disposed within the bobbin 210 adjacent to the plunger stop 220. As shown, the plunger 224 defines a proximal end 225 and a distal end 226. The proximal end 225 of the plunger 224 is formed with a first bore 227 in which a first elastomeric plug 228 is disposed. It can be appreciated that the first elastomeric plug 228 can cushion any impact between the plunger 224 and the plunger stop 220. FIG. 3 also shows that the plunger 224 can also be formed with a second bore 229 in the distal end 226 of the plunger 224. A second elastomeric plug 230 can be disposed in the second bore 229. It can be appreciated that the second elastomeric plug 230 can cushion impact between the plunger 224 and a plunger seat and can further provide a greater seal between the two.

Figure 4:
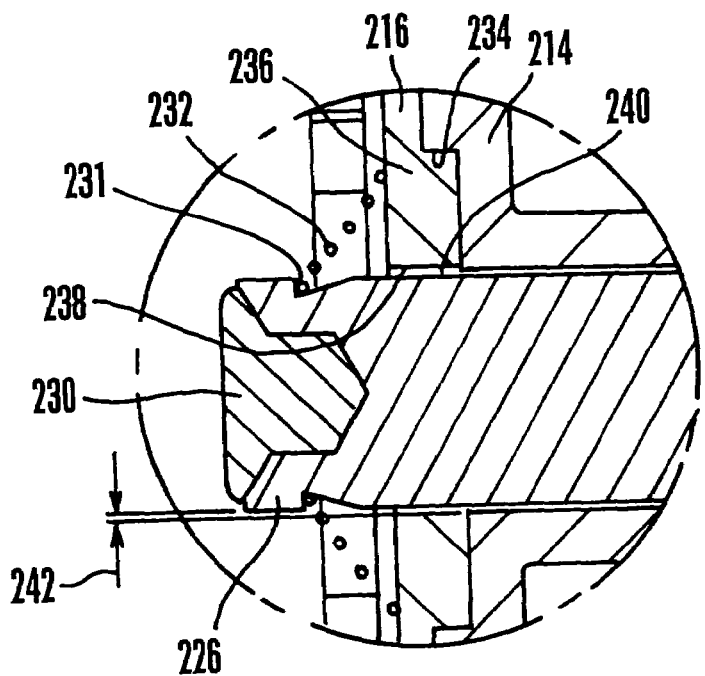
FIG. 4 is a detailed view of the first alternative tubeless actuator taken at circle 4 in FIG. 3.

Referring to FIG. 4, further details concerning the actuator 200 are more easily seen. FIG. 4 shows that the distal end 226 of the plunger 224 is formed with an annular notch 231 around its outer periphery. A frusto-conical spring 232 is installed in compression around the distal end 228 of the plunger 224 between the annular notch 231 and the secondary plate 216. When the coil 218 is de-energized the spring 232 forces the plunger 224 to the left looking at FIG. 4. As such, the second elastomeric plug 230 that is installed in the plunger 224 can engage a plunger seat, e.g., the plunger seat 34 shown in FIG. 1, to block the flow of fluid therethrough.

It can be appreciated that the plunger stop 220 can be adjusted to limit the travel of the plunger 224 without further compressing the frusto-conical spring 232 and changing the spring preload because of the position of the frusto-conical spring 232 between the plunger 224 and the secondary plate 216.

FIG. 4 further shows that the distal flange 214 of the bobbin 210 is formed with a generally cylindrical central bore 234. Moreover, the secondary plate 216 is formed with a correspondingly sized and shaped central hub 236 that fits into the cylindrical bore 234 formed by the secondary plate 216. As intended by the present invention, the central hub 236 engages the central bore 234 in order to maintain proper alignment between the secondary plate 216 and the bobbin 210.

As shown in FIG. 4, the secondary plate 216 defines an inner wall 238 and the plunger 224 defines an outer wall 240. As shown, a generally annular, secondary air gap 242 is established between the inner wall 238 of the secondary plate 216 and the outer wall 240 of the plunger 224. In this embodiment, the secondary air gap 242 is approximately one-quarter of a millimeter (0.25 mm).

Figure 5:
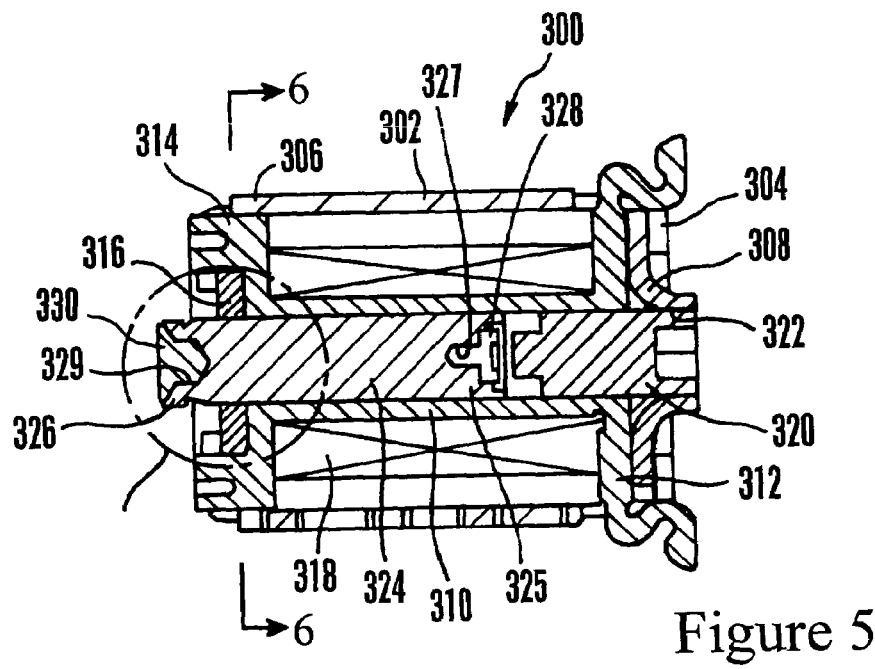
FIG. 5 is a cross-section view of a second alternative tubeless actuator.

FIG. 5 shows a second alternative tubeless actuator, generally designated 300. It is to be understood that the tubeless actuator 300 shown in FIG. 5 can be installed in a valve body similar to the valve body 10 described above in conjunction with FIG. 1.

FIG. 5 shows that the tubeless actuator 300 includes a hollow, generally cylindrical frame 302 that defines a proximal end 304 and a distal end 306. As shown, a primary plate 308 is installed within the frame 302 adjacent to the proximal end 304 of the frame 302. A hollow, generally "I" shaped bobbin 310 is installed within the frame 302 adjacent to the primary plate 308. The bobbin 310 includes a proximal flange 312 and a distal flange 314. FIG. 5 shows that the proximal flange 312 of the bobbin 310 is adjacent to the primary plate 308. Moreover, a secondary plate 316 is installed within the frame 302 such that it is adjacent to the distal flange 314 of the bobbin 310. As such, the bobbin 310 is sandwiched between the primary plate 308 and the secondary plate 314.

As shown in FIG. 5, a coil 318 is wound around the bobbin 310. Moreover, a plunger stop 320 is installed within the bobbin 310, e.g., such that it is surrounded by the proximal flange 312. It can be appreciated that the plunger stop 320 can be formed with external threads that engage internal threads formed by the primary plate 308. It is to be understood that the plunger stop 320 cannot move relative to the bobbin 310 unless it is being adjusted, e.g., by rotating plunger stop 320 relative to the primary plate 308.

FIG. 5 further shows a plunger 324 that is slidably disposed within the bobbin 310 adjacent to the plunger stop 320. As shown, the plunger 324 defines a proximal end 325 and a distal end 326. The proximal end 325 of the plunger 324 is formed with a first bore 327 in which a first elastomeric plug 328 is disposed. It can be appreciated that the first elastomeric plug 328 can cushion any impact between the plunger 324 and the plunger stop 320. FIG. 5 also shows that the plunger 324 can also be formed with a second bore 329 in the distal end 326 of the plunger 324. A second elastomeric plug 330 can be disposed in the second bore 329. It can be appreciated that the second elastomeric plug 330 can cushion impact between the plunger 324 and a plunger seat and can further provide a greater seal between the two.

Figure 6:
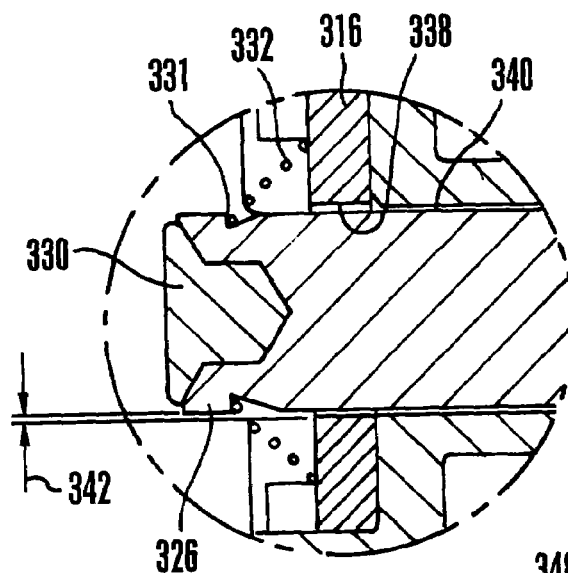
FIG. 6 is a detailed view of the second alternative tubeless actuator taken at circle 6 in FIG. 5.

Referring to FIG. 6, further details concerning the actuator 300 are more easily seen. FIG. 6 shows that the distal end 326 of the plunger 324 is formed with an annular notch 331 around its outer periphery. A frusto-conical spring 332 can be installed in compression around the distal end 326 of the plunger 324 between the annular notch 331 and the secondary plate 316. When the coil 318 is de-energized the spring 332 forces the plunger 324 to the left looking at FIG. 6. As such, the second elastomeric plug 330 can engage a plunger seat, e.g., the plunger seat 34 shown in FIG. 1, in order to block the flow of fluid therethrough.

It can be appreciated that the plunger stop 320 can be adjusted to limit the travel of the plunger 324 without further compressing the frusto-conical spring 332 and changing the spring preload because of the position of the frusto-conical spring 332 between the plunger 324 and the frame 302.

As shown in FIG. 6, the secondary plate 316 defines an inner wall 338 and that the plunger 324 defines an outer wall 340. A shown, a generally annular, secondary air gap 342 is established between the inner wall 338 of the secondary plate 316 and the outer wall 340 of the plunger 324. In a this embodiment, the secondary air gap 130 is approximately one-quarter of a millimeter (0.25 mm).

Figure 7:
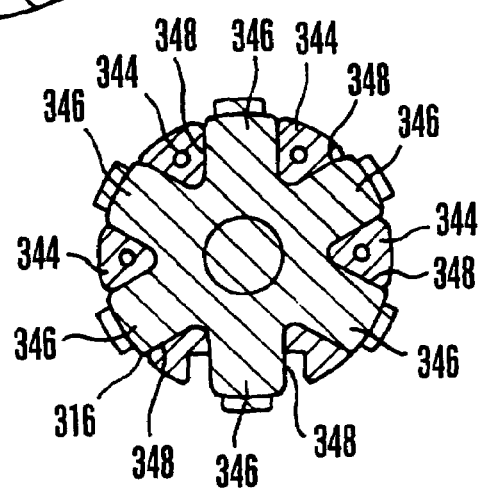
FIG. 7 is a cross-section view of the second alternative tubeless actuator taken along line 7—7 in FIG. 5.

Referring now to FIG. 7, it is shown that the distal flange 314 of the bobbin 310 is formed with a plural wedge-shape protrusions 344 equally spaced around the outer periphery of the distal flange 314. These wedges 344 extend toward the secondary plate 316. FIG. 7 further shows that the secondary plate 316 is formed with plural spokes 346 that extend radially from the secondary plate 316. Between each consecutive pair of spokes 346, a wedge-shaped opening 348 is established. Each wedge-shaped opening 348 is sized and shaped to receive the wedge shaped protrusions 344 which extend from the distal flange 314 of the bobbin 310. As intended by the present invention, the wedge-shaped protrusions 348 engage the wedge-shaped openings 348 in order to maintain proper alignment between the secondary plate 316 and the bobbin 310.

With the configuration of structure described above, the TUBELESS ACTUATOR WITH REDUCED SECONDARY AIR GAP can be used to control the flow of fluid through a vehicle carbon canister. Without the need for a tube, the secondary air gap can be fully minimized. Moreover, by keying the bobbin to the secondary plate, the alignment between the two can be maintained over the life of the tubeless actuator. Further, by placing the conical spring between the end of the plunger and the secondary plate instead between the plunger and the plunger stop, the plunger stop can be adjusted to limit the travel of the plunger without changing the force of the spring on the plunger.

While the particular TUBELESS ACTUATOR WITH REDUCED SECONDARY AIR GAP as herein shown and described in detail is fully capable of attaining the above-described objects of the invention, it is to be understood that it is the presently preferred embodiment of the present invention and thus, is representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather one or more." All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it is to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. section 112, sixth paragraph, unless the element is expressly recited using the phrase "means for."

We claim:

1. A tubeless actuator, comprising:
   a frame;
   a primary plate disposed within the frame;
   a secondary plate disposed within the frame opposite the primary plate; and
   a bobbin disposed within the frame between the primary plate and the secondary plate; and
   an annular rib extending from the bobbin wherein the annular rib is greater in diameter than an inner wall of the secondary plate;
   an annular groove established by the secondary plate; and
   wherein the annular rib engages the annular groove to maintain alignment between the secondary plate and the bobbin.

2. The tubeless actuator of claim 1, further comprising:
   a plunger slidably disposed within the bobbin; and
   wherein the plunger slides in direct contact with the bobbin.

3. The tubeless actuator of claim 2, further comprising:
   a secondary air gap established between an inner wall established by the secondary plate and an outer wall established by the plunger.

4. The tubeless actuator of claim 3, wherein the plunger defines a distal end and the tubeless actuator further comprises:
   an annular notch established around an outer periphery of the distal end of the plunger.

5. The tubeless actuator of claim 4, further comprising:
   a frusto-conical spring disposed around the distal end of the plunger; and
   wherein the frusto-conical spring engages the annular notch.

6. A tubeless actuator, comprising:
   a frame;
   a primary plate disposed within the frame;
   a secondary plate disposed within the frame opposite the primary plate; and
   a bobbin disposed within the frame between the primary plate and the secondary plate, the bobbin having at least one flange, the flange having an outer periphery; and
   at least one wedge-shaped protrusion extending from the outer periphery of the flange of the bobbin;
   at least one wedge-shaped opening established by the secondary plate; and
   wherein the wedge-shaped protrusion engages the wedge-shaped opening to maintain alignment between the secondary plate and the bobbin.

* * * * *